United States Patent [19]

Izumi et al.

[11] Patent Number: 5,720,807
[45] Date of Patent: Feb. 24, 1998

[54] HYDRAULIC COMPOSITION AND PROCESS FOR PREPARING THE SAME

[75] Inventors: Tatsuo Izumi; Hotaka Yamamuro; Shin Murahara; Akira Kurara, all of Wakayama, Japan

[73] Assignee: Kao Corporation, Tokyo, Japan

[21] Appl. No.: 696,951

[22] PCT Filed: Feb. 20, 1995

[86] PCT No.: PCT/JP95/00241

§ 371 Date: Aug. 22, 1996

§ 102(e) Date: Aug. 22, 1996

[87] PCT Pub. No.: WO95/22510

PCT Pub. Date: Aug. 24, 1995

[30] Foreign Application Priority Data

Feb. 22, 1994 [JP] Japan .......................... 6-24365

[51] Int. Cl.$^6$ .................................... C04B 24/04
[52] U.S. Cl. .................. 106/696; 106/724; 106/728; 106/802; 106/823; 524/5
[58] Field of Search .................. 106/724, 728, 106/696, 823, 802; 524/5

[56] References Cited

U.S. PATENT DOCUMENTS 4,946,901  8/1990  Akimoto et al. ................ 106/724

FOREIGN PATENT DOCUMENTS

| | | |
|---|---|---|
| 0560602A | 9/1993 | European Pat. Off. . |
| 4324334A | 1/1994 | Germany . |
| 55-23047 | 2/1955 | Japan . |
| 1-113419 | 5/1989 | Japan . |
| 1-219053 | 9/1989 | Japan . |
| 2-7901 | 2/1990 | Japan . |
| 2-8983 | 2/1990 | Japan . |
| 2-180739 | 7/1990 | Japan . |
| 4-119955 | 4/1992 | Japan . |
| 4-119956 | 4/1992 | Japan . |
| 5-58696 | 3/1993 | Japan . |
| 5-85788 | 4/1993 | Japan . |
| 6-191914 | 7/1994 | Japan . |
| 5108902 | 10/1994 | Japan . |
| 5108903 | 10/1994 | Japan . |
| 1182448A | 2/1970 | United Kingdom . |
| 2215723A | 9/1989 | United Kingdom . |
| 9112214A | 8/1991 | WIPO . |

Primary Examiner—Paul Marcantoni
Attorney, Agent, or Firm—Birch, Stewart, Kolasch & Birch, LLP

[57] ABSTRACT

A hydraulic composition comprising a water-soluble polymer in the form of a polyalkylene oxide derivative having a hydroxyl number of at most 50 KCH-mg/g in terms of terminal hydroxyl groups rendered hydrophobic, a surfactant having a weight-average molecular weight of at most 5,000, a superplasticizer, and a hydraulic powder, which can be endowed with high flowability, aggregate segregation resistance, and strength to remarkably improve the method of using concrete and the method of placing concrete and to thereby greatly enhance the far-reaching effect of eliminating noise pollution particularly in the production of concrete products and streamlining the production of the concrete products.

22 Claims, No Drawings

HYDRAULIC COMPOSITION AND PROCESS FOR PREPARING THE SAME

FIELD OF INDUSTRIAL APPLICATION

The present invention relates to a hydraulic composition having a high flowability and no need of compaction. More particularly, the present invention relates to a hydraulic composition capable of increasing the viscosities and flowabilities of concrete, mortar and paste to be used as a construction material and a secondary product material and having an excellent resistance to segregation caused by aggregate, cement and water, and no need of compaction through vibration with a vibrator or the like.

PRIOR ART

The conventional method of placing a concrete composition generally comprises supplying concrete into a form wherein reinforcing steel bars are disposed, and compacting the concrete through vibration with a vibrator. However, noise pollution caused by the vibrator during concrete placing and a lack of manpower in the concrete industry have recently become problems.

In order to solve these problems, investigations into self-packing concrete which can dispense with vibration compaction have started, but the fact is that no such self-packing concrete is yet to be technologically put into practical use.

In Japanese Patent Laid-Open No. 85,788/1993, there has been proposed a self-packing concrete composition wherein use is made of a superplasticizer and a water-soluble polymer having an alkylene oxide chain. This concrete composition, though excellent in segregation resistance and self-packing properties just after being prepared, involves the problem of a decrease in self-packing properties with time.

DISCLOSURE OF THE INVENTION

In view of the foregoing, the inventors of the present invention have made intensive investigations with a view to solving the above-mentioned problem to find a self-packing concrete composition having high flowability, high aggregate segregation resistance, and reduced in the lowering of self-packing properties even after the lapse of time. The present invention has been completed based on this finding.

Specifically, in accordance with the present invention, there is provided a hydraulic composition characterized by comprising:

(a) a polyoxyalkylene derivative having a polyoxyalkylene chain having 10 to 2,000 mol of added alkylene oxide units in the molecule and having the molecular terminals thereof rendered hydrophobic;

(b) a thickening accelerator having a weight-average molecular weight of at most 5,000;

(c) a superplasticizer; and (d) a hydraulic powder.

In accordance with the present invention, there is also provided a hydraulic composition characterized by comprising a water-soluble polymer in the form of a polyalkylene oxide derivative having a hydroxyl value of at most 50 KOH-mg/g in terms of terminal hydroxyl groups rendered hydrophobic; a thickening accelerator having a weight-average molecular weight of at most 5,000; a superplasticizer; and a hydraulic powder. In this embodiment of the present invention, the polyalkylene oxide derivative is preferably a reaction product prepared from an alkylene oxide adduct of a monohydric alcohol having 6 to 30 carbon atoms in the molecule, a monovalent mercaptan having 6 to 30 carbon atoms in the molecule or an alkylphenol having 6 to 30 carbon atoms in the molecule with 10 to 1,000 mol of an alkylene oxide, and a compound having 2 to 6 epoxy groups, a dicarboxylic acid, a dicarboxylic acid anhydride or a diisocyanate; a reaction product prepared from an epoxy compound having 6 to 30 carbon atoms, a fatty acid having 6 to 30 carbon atoms or an alkyl isocyanate having 6 to 30 carbon atoms, and a polyalkylene oxide prepared by polymerizing 10 to 2,000 mol of an alkylene oxide; or a reaction product prepared by reacting at least one member selected from the group consisting of compounds having 2 to 6 epoxy groups, dicarboxylic acids, dicarboxylic acid anhydrides and diisocyanates with a polyalkylene oxide prepared by polymerizing 10 to 2,000 mol of an alkylene oxide, and then reacting the resulting product with an epoxy compound having 6 to 30 carbon atoms, a fatty acid having 6 to 30 carbon atoms or an alkyl isocyanate having 6 to 30 carbon atoms.

Where the hydraulic composition of the present invention is used as a concrete which can dispense with compaction, the slump flow value thereof must be at least 50 cm in the slump test stipulated in JIS A 1101. The slump flow value is preferably 50 to 70 cm in order to secure sufficient packing properties. When this value is lower than 50 cm, no sufficient packing properties can be secured. When it exceeds 70 cm, segregation between cement paste and gravel is brought about to cause occlusion between reinforcing steel bars by the gravel, resulting in a failure in securing sufficient packing properties.

The hydraulic powder to be used in the present invention is preferably cement or a mixture of cement with a fine powder of at least 8,000 cm$^2$/g in fineness. The fine powder of at least 3,000 cm$^2$/g in fineness that may be used is at least one member selected from the group consisting of blast-furnace slag, fly ash, silica fume, stone powder, etc., among which blast-furnace slag, fly ash, and stone powder are desirable having regard to the aspects of cost and supply. The larger the specific surface area of the fine powder as a yardstick of the fineness of powder, the better from the viewpoint of segregation resistance. For example, in the case of blast-furnace slag, the specific surface area is preferably 5,000 to 10,000 cm$^2$/g. Even when the fineness of powder is below the above-mentioned range, however, desired segregation resistance can be secured by increasing the amount of the fine powder to be blended.

Examples of (a) the polyoxyalkylene derivative having a polyoxyalkylene oxide chain having 10 to 2,000 mol of added alkylene oxide units in the molecule and having the molecular terminals thereof rendered hydrophobic include the following compounds (1) to (3):

(1) A reaction product prepared from an alkylene oxide adduct of a monohydric alcohol having 6 to 30 carbon atoms in the molecule, a monocarboxylic acid having 6 to 30 carbon atoms in the molecule, a monovalent mercaptan having 6 to 30 carbon atoms in the molecule or an alkylphenol having 8 to 30 carbon atoms in the molecule with 10 to 1,000 mol of an alkylene oxide, and a compound having 2 to 6 epoxy groups, a dicarboxylic acid, a dicarboxylic acid anhydride or a diisocyanate.

(2) A reaction product prepared from an epoxy compound having 6 to 30 carbon atoms, a fatty acid having 6 to 30 carbon atoms or an alkyl isocyanate having 6 to 30 carbon atoms, and a polyalkylene oxide prepared by polymerizing 10 to 2,000 mol of an alkylene oxide.

(3) A reaction product prepared by reacting at least one compound selected from the group consisting of compounds having 2 to 6 epoxy groups, dicarboxylic acid, dicarboxylic acid anhydrides and diisocyanates with a polyalkylene glycol having 10 to 2,000 mol of oxyalkylene chains, and then reacting the resulting product with an epoxy compound having 6 to 30 carbon atoms, a fatty acid having 6 to 30 carbon atoms or an alkyl isocyanate having 6 to 30 carbon atoms.

In the present invention, representative examples of the monohydric alcohol having 6 to 30 carbon atoms in the molecule, the monocarboxylic acid having 6 to 30 carbon atoms in the molecule, the monovalent mercaptan having 8 to 30 carbon atoms in the molecule or the alkylphenol having 6 to 30 carbon atoms in the molecule thereof include alkylphenols such as octylphenol, nonylphenol, dodecylphenol, diamylphenol, dioctylphenol, and dinonylphenol; monohydric aliphatic alcohols such as dodecyl alcohol, tridecyl alcohol, hexadecyl alcohol, 2-hexyldecyl alcohol, and octadecyl alcohol; monocarboxylic acids such as octanoic acid, dodecanoic acid, octadecanoic acid, and oleic acid; monohydric alicyclic alcohols such as abietyl alcohol; and monovalent aliphatic mercaptans such as dodecyl mercaptan. They may be used either alone or in mixture.

The alkylene oxide adduct suitable for use in the present invention is prepared through a random or block addition reaction of the above-mentioned monohydric alcohol having 6 to 30 carbon atoms in the molecule, monocarboxylic acid having 8 to 30 carbon atoms in the molecule, monovalent mercaptan having 6 to 30 carbon atoms or alkylphenol having 6 to 30 carbon atoms with 10 to 1,000 mol, preferably 50 to 750 mol, of ethylene oxide alone or both of ethylene oxide and propylene oxide.

Where a combination of ethylene oxide with propylene oxide is used as the alkylene oxide, the molar ratio of both to be used in the addition reaction is preferably such that at least 80 mol % of ethylene oxide is used in combination with at most 20 mol % of propylene oxide. The number of moles of addition is preferably about 100 to about 250 in an aspect of performance.

Examples of the compound having 2 to 6 epoxy groups that may be used in the present invention include β,γ-epoxypropyl ether, 1,2-bis(β,γ-epoxypropoxy)ethane, 1,3-bis(β,γ-epoxypropoxy)propane, 1,4-bis(β,γ-epoxypropoxy) butane, 1,2-bis(β-methyl-β,γ-epoxypropoxy)ethane, 1,2-bis (β-epoxy-γ-methoxy)ethane, 1,6-bis(epoxyethyl)hexane, 1,4-bis(β,γ-epoxy-propoxy)benzene, 2,2-bis[p-(β,γ-epoxypropoxy)-phenyl]propane, 1-epoxyethyl-3,4-epoxycyclohexane (common name: vinylcyclohexene diepoxide), and α-limonene diepoxide, among which diepoxides such as 2,2-bis[p-(β,γ-epoxypropoxy)phenyl] propane, 1-epoxyethyl-3,4-epoxycyclohexane (common name: vinylcyclohexene diepoxide), and α-limonene diepoxide are especially preferred.

Examples of the dicarboxylic acid, dicarboxylic acid anhydride or isocyanate that may be used in the present invention include maleic anhydride, itaconic anhydride, phthalic anhydride, citraconic anhydride, maleic acid, itaconic acid, terephthalic acid, citraconic acid, and diphenylmethane diisocyanate.

Examples of the epoxy compound having 8 to 80 carbon atoms, fatty acid having 6 to 30 carbon atoms that may be useful in the present invention include phenyl glycidyl ether, p-t-butylphenyl glycidyl ether, polyoxyethylene lauryl alcohol glycidyl ether, lauric acid, myristic acid, palmitic acid, stearic acid, oleic acid and behenic acid. And, as other from them, phenyl isocyanate and so on are listed.

Examples of the polyalkylene glycol that may be used in the present invention are polyethylene glycol, or a mixed polyalkylene glycol obtained through random or block copolymerization of 10 to 2,000 mol in total of ethylene oxide and propylene oxide.

In the present invention, any of anionic, cationic, ampholytic and nonionic surfactants can be used as the thickening accelerator having a weight-average molecular weight of at most 5,000. Specific examples of the thickening accelerator usable in the present invention include anionic surfactants such as salts of lauryl sulfates, salts of alkylbenzene-sulfuric acids, salts of dialkylsulfosuccinic acids, salts of polyoxyethylene alkyl ether sulfates, and salts of maleic anhydride copolymers; nonionic surfactants such as polyoxyethylene alkyl ethers, polyoxyethylene alkylphenol ethers, polyoxyethylene styrenated phenol ether, polyoxyethylene tribenzylated o-phenylphenol ether, polyoxyethylene polyoxypropylene octylphenol ether, and polyoxyethylene alkylamine; cationic surfactants such as alkyltrimethylammonium chlorides, alkylbenzyldimethylammonium chlorides, and alkylamine acetates; and ampholytic surfactants such as coconut betaine. Anionic and nonionic surfactants are preferred from the standpoint of cost and performance, and those having a hydrophilic-lipophilic balance (HLB; according to the Griffin method) falling within the range of 10 to 20 are especially excellent in the effect of thickening acceleration. Among others, nonionic surfactants of 12 to 18 in HLB are excellent in performance.

The amount of the polyoxyalkylene derivative (a) to be added is suitably 0.1 to 5.0 wt. %, preferably 0.1 to 3.0 wt. %, based on water necessary for preparation of the hydraulic composition, though the most suitable amount thereof is varied depending on the length of the alkylene oxide chains in the molecule. The amount of the thickening accelerator (b) to be added is preferably 0.1 to 10 times (by weight), especially preferably 0.2 to 5 times (by weight), as much as the amount of the component (a) to be added.

In order to secure a high flowability (slump flow value of at least 50 cm) in the hydraulic composition of the present invention, the superplasticizer (c) as the active ingredient may be added in an amount (in terms of active ingredient) of 0.3 to 3.0 wt. %, preferably 0.5 to 2.5 wt. %, based on cement. Usable examples of the superplasticizer include formaldehyde condensates of at least one compound selected from the group consisting of methylolation and sulfonation products of each of naphthalene, melamine, phenol, urea, and aniline, examples of which include metal naphthalenesulfonate-formaldehyde condensates [e.g. MIGHTY 150: trademark of Kao Corporation), metal melaminesulfonate-formaldehyde condensates [e.g., MIGHTY 150-V2: trademark of Kao Corporation], phenolsulfonic acid-formaldehyde condensate, and phenolsulfanilic acid-formaldehyde co-condensates (compounds as disclosed in U.S. Pat. No. 4,938,918A corresponding to Japanese Patent Laid-Open No. 113,419/1989, etc.). Examples of the superplasticizer are polymers and copolymers obtained by polymerizing at least one monomer selected from the group consisting of unsaturated monocarboxylic acids and derivatives thereof, and unsaturated dicarboxylic acids and derivatives thereof (compounds as disclosed in Japanese Patent Publication No. 7,901/1990, Japanese Patent Laid-Open No. 75,252/1991, and Japanese Patent Publication No. 8,983/1990, etc.). The hydraulic composition of the present invention is used in producing a concrete molding. Although the concrete molding is not particularly limited, it is usually desired to be a molding compacted with a vibrator.

In the method of adding the superplasticizer (c) to a cement blend, the superplasticizer (c) may be either in the form of an aqueous solution thereof or in the form of a powder thereof, while addition thereof can be effected through dry-blending thereof with the cement blend, through dissolution thereof in mixing water, or at the beginning of initiation of mixing a cement blend; more specifically, simultaneously with the addition of water to cement or at any time during the period ranging from just after the addition of water to cement to the point of time of completion of mixing a cement blend. The super-plasticizer (c) may alternatively be added to a cement blend once mixed up. Further, there may be adopted a method wherein the whole of the superplasticizer (c) is added all at once, or a method wherein the whole of the superplasticizer (c) is divided into several portions, which are respectively added at different points of time.

Although the present invention provides a hydraulic composition comprising the components (a) to (d), a mixture of the components (a) to (c) may be prepared before being added to the component (d) either all at once or dividedly in the course of the preparation of the hydraulic composition.

Accordingly, the present invention also provides a concrete additive comprising the components (a), (b), and (c).

Where a known dispersant is used in combination with the superplasticizer (c), ligninsulfonic acid or a salt thereof, a hydroxycarboxylic acid or a salt thereof, a polycarboxylic acid or a salt thereof, a polyalkylcarboxylic acid anhydride or a salt thereof (e.g., U.S. Pat. No. 4,586,960A corresponding to Japanese Patent Publication No. 5,346/1988 and U.S. Pat. No. 4,963,190A corresponding to Japanese Patent Laid-Open No. 270,550/1989), or the like may be premixed with that. Alternatively, after one of them is blended with cement or a cement blend or after one of them is kneaded together with cement or a cement blend, the other may be blended with the resulting blend.

Further, at least one other cement additive (material) may be used in combination. Examples of such other cement additive (material) include a sustainedly releasable dispersant, AE water-reducing agent, plasticizer, setting retarder, high-early-strength additive, setting accelerator, foaming agent, blowing agent, defoaming agent, water-retaining agent, thickening agent, self-leveling agent, water-proofing agent, rustproofing agent, colorant, moldproofing agent, a crack-decreasing agent, polymer emulsion, expanding admixture (material), and glass fiber.

EFFECTS OF THE INVENTION

The hydraulic composition of the present invention is endowed with excellent self-packing properties thanks to the high flowability and good aggregate segregation resistance thereof. Further, since it is reduced in a decrease in self-packing properties with time to enable a strength to be secured, the method of using concrete and the method of placing concrete can be remarkably improved to be greatly enhanced in the far-reaching effects of eliminating noise pollution particularly in the production of concrete products and streamlining the production of concrete products.

EXAMPLES

The following Preparation Examples and Examples will illustrate the present invention, but should not be construed as limiting the scope of the present invention. The % in the following Examples is given by weight unless otherwise specified.

<Materials> cement (C):

ordinary portland cement (specific gravity: 3.17)

fine aggregate (S):

sand occurring in Kinokawa (specific gravity: 2.57)

coarse aggregate (G):

crushed stone occurring in Takarazuka (specific gravity: 2.62)

fine powder (F)

blast-furnace slag:

specific surface area: 8,000 $cm^2/g$, specific gravity: 2.90 fly ash:

specific surface area: 3,600 $cm^2/g$, specific gravity: 2.90 stone powder:

specific surface area: 3,500 $cm^2/g$, specific gravity: 2.70

<Method of mixing concrete>

A cement dispersant was dissolved in mixing water and mixed with 50 l of concrete with a 100-l tilted cylinder mixer at 20° C. for 3 minutes. Thereafter, the slump flow value and aggregate segregation resistance of the resulting mixture were examined. The slump test was carried out according to JIS A 1101.

The formulations of the concrete compositions prepared using the above-mentioned materials are listed together with the plasticizers, water-soluble polymers and thickening accelerators in Tables 1 to 4.

TABLE 1

| Formulation No. | W/P (%) | Unit quantity (kg/m³) | | | | | Fine powder (F) (vol. ratio) | Amt. of power (vol. %) |
|---|---|---|---|---|---|---|---|---|
| | | W | C | F | S | G | | |
| 1 | 36.2 | 167 | 304 | 157 | 777 | 893 | slag | 15.0 |
| 2 | 30.9 | 167 | 370 | 171 | 740 | 851 | stone powder | 18.0 |
| 3 | 21.9 | 167 | 425 | 336 | 656 | 754 | fly ash | 25.0 |
| 4 | 35.1 | 167 | 476 | — | 777 | 893 | — | 15.0 |
| 5 | 34.0 | 167 | 370 | 121 | 765 | 879 | slag/stone powder (50/50) | 16.0 |

*Amt. of powder = (C + F)/whole concrete composition.

TABLE 2

| Division | No. | Plasticizer |
|---|---|---|
| Present Invention | 1 | salt of naphthalenesulfonic acid-formaldehyde condensate (trade name: MIGHTY 150, manufactured by Kao Corporation) |

TABLE 2-continued

| Division | No. | Plasticizer |
|---|---|---|
| | 2 | salt of melaminesulfonic acid-formaldehyde condensate (trade name: MIGHTY 150V-2, manufactured by Kao Corporation) |
| | 3 | salt of phenolsulfonic acid-formaldehyde condensate |
| | 4 | phenol-salt of sulfanilic acid-formaldehyde cocondensate (sample prepared according to Example 15 of Japanese Patent Laid-Open No. 113,419/1989) |
| | 5 | alkylene oxide-added monomer-carboxylic acid monomer copolymer (sample prepared according to Referential Example 5 of Japanese Patent Publication No. 7,901/1990) |
| | 6 | polycarboxylic acid copolymer (sample prepared according to Synthesis Example of Japanese Patent Publication No. 8,983/1990) |
| | 7 | polycarboxylic acid copolymer (trade name: FC600S, manufactured by Nippon Shokubai Kagaku Kogyo Co., Ltd.) |
| Comparison | 8 | salt of ligninsulfonic acid (trade name: SAN-EX, Sanyo-Kokusaku Pulp Co., Ltd.) |

TABLE 3

| Division | No. | Water-soluble polymer |
|---|---|---|
| Present Invention | 1 | POA derivative* prepared in the following Preparation Example 1 |
| | 2 | POA derivative* prepared in the following Preparation Example 2 |
| | 3 | POA derivative* prepared in the following Preparation Example 3 |
| | 4 | POA derivative* prepared in the following Preparation Example 4 |
| | 5 | POA derivative* prepared in the following Preparation Example 5 |
| | 6 | POA derivative* prepared in the following Preparation Example 6 |
| | 7 | POA derivative* prepared in the following Preparation Example 7 |
| | 8 | POA derivative* prepared in the following Preparation Example 8 |
| Comparison | 9 | methylcellulose [trade name: CMC Daicel 1170, manufactured by Daicel Chemical Industries, Ltd.] |

*: POA derivative = polyoxyalkylene derivative.

TABLE 4

| No. | Thickening accelerator | Wt.-av. mol. wt. |
|---|---|---|
| 1 | sodium alkylbenzenesulfonate (trade name: NEOPELEX F-60, manufactured by Kao Corporation) | 340 |
| 2 | sodium salt of styrene-maleic anhydride copolymer (trade name: DEMOL ST, manufactured by Kao Corporation) | 4200 |
| 3 | polyoxyethylene octylphenol ether (trade name: EMULGEN 810, manufactured by Kao Corporation | 1950 |
| 4 | polyoxyethylene lauryl ether (trade name: EMULGEN 150, manufactured by Kao Corporation) | 2270 |
| 5 | polyoxyethylene tribenzylated phenol ether (trade name: EMULGEN B100, manufactured by Kao Corporation) | 1800 |
| 6 | alkylamine acetate (trade name: ACETAMIN 24, manufactured by Kao Corporation) | 240 |

Preparation Example 1

2.4 g of vinylcyclohexene diepoxide (epoxy equivalent: 76) was added to 85 g of an adduct of KALCOHL 86 [trade name of a mixture of stearyl alcohol with cetanol, hydroxyl value: 200, manufactured by Kao Corporation] with 200 mol of ethylene oxide prepared in the presence of an alkali catalyst to effect a reaction at 140° C. for 3 hours. The resulting reaction mixture was then neutralized with acetic acid. The resulting water-soluble polymer had a hydroxyl value of 5.5 KOH-mg/g in terms of terminal hydroxyl group.

Preparation Example 2

3.3 g of vinylcyclohexene diepoxide (epoxy equivalent: 76) was reacted with 100 g of a random adduct (the number of moles of added ethylene oxide: 200, the number of moles of added propylene oxide: 20 of nonylphenol with ethylene oxide and propylene oxide (molar ratio: 10:1) synthesized according to substantially the same procedure as in Preparation Example 1 to prepare a reaction product having a hydroxyl number of 7.4 KOH-mg/g in terms of terminal hydroxyl group.

Preparation Example 3

6.6 g of vinylcyclohexene diepoxide (epoxy equivalent: 76) was reacted with 100 g of an ethylene oxide adduct to dodecyl mercaptan (the number of moles of addition: 100) synthesized according to substantially the same procedure as in Preparation Example 1 to prepare a reaction product having a hydroxyl number of 10.4 KOH-mg/g in terms of terminal hydroxyl group.

Preparation Example 4

0.7 g of maleic anhydride was reacted with 100 g of an adduct of palmityl alcohol with ethylene oxide (the number of moles of addition: 150), synthesized according to substantially the same procedure as in Preparation Example 1, in chloroform in the presence of a solid catalyst under reflux for 5 hours. The resulting water-soluble polymer had a hydroxyl number of 15.6 KOH-mg/g in terms of terminal hydroxyl group.

Preparation Example 5

0.6 g of diphenylmethane diisocyanate was added to 100 g of an adduct of abietyl alcohol with ethylene oxide (the number of moles of addition: 20) synthesized according to substantially the same procedure as in Preparation Example 1 to effect a reaction at 110° C. for 3 hours. The resulting water-soluble polymer had a hydroxyl value of 32.5 KOH-mg/g in terms of terminal hydroxyl group.

Preparation Example 6

100 g of polyethylene glycol (average molecular weight: 20,000) was reacted with 1.5 g of phenyl glycidyl ether (epoxy equivalent: 154) in the presence of an alkali catalyst at 140° C. for 3 hours, followed by neutralization with acetic acid. The resulting water-soluble polymer had a hydroxyl value of 1.5 KOH-mg/g in terms of terminal hydroxyl group.

Preparation Example 7

4.1 g of behenic acid was reacted with 100 g of a random adduct (the number of moles of added ethylene oxide: 300, the number of moles of added propylene oxide: 60) of ethylene glycol with ethylene oxide and propylene oxide (molar ratio: 10:2), synthesized according to substantially the same procedure as in Preparation Example 1, in chloroform in the presence of a solid catalyst under reflux for 5 hours. The resulting water-soluble polymer had a hydroxyl value of 2.8 KOH-mg/g in terms of terminal hydroxyl group.

Preparation Example 8

100 g of polyethylene glycol (average molecular weight: 10,000) was reacted with 0.2 g of vinylcyclohexene diepoxide (epoxy equivalent: 76) in the presence of an alkali catalyst at 140° C. for 3 hours. The resulting reaction mixture was admixed with 8.5 g of polyoxyethylene lauryl alcohol glycidyl ether (epoxy equivalent: 952) to effect a reaction at 140° C. for 3 hours, followed by neutralization with acetic acid. The resulting water-soluble polymer had a hydroxyl number of 12.3 KOH-mg/g in terms of terminal hydroxyl group.

<Method of measuring hydroxyl value>

A polyalkylene oxide derivative having the terminal groups thereof rendered hydrophobic was reacted with acetic anhydride, and acetic acid as a by-product was then neutralized with potassium hydroxide. The amount (mg) of the potassium hydroxide required for the neutralization was converted into the value thereof per g of the polyalkylene oxide derivative, which was defined as the hydroxyl number, the unit of which is KOH-mg/g.

(3) Evaluation item

1. Slump flow

Slump flow value (cm) according to JIS A 1101. Just after mixing and after the lapse of 90 minutes.

2. Aggregate segregation resistance

It was evaluated visually (with the naked eye). The ratings of evaluation are as follows:
   o: free of aggregate and water segregation,
   x: aggregate and water segregation.

3. Self-packing properties 90 minutes after mixing of concrete, the concrete was compacted into a cylindrical form of 10 cm Φ, followed by setting and demolding. Thereafter, the packing state of the surface of the concrete was visually observed. The ratings of evaluation are as follows:
   o: free of formation of voids of at least 3mm,
   Δ: formation of a few voids of at least 3 mm,
   x: formation of many voids of at least 3 mm.

The results of the foregoing evaluations are shown in Tables 5 and 6.

TABLE 5

| Division | Formulation No. | Plasticizer No. | Plasticizer amt.* (%) | Water-soluble polymer No. | Water-soluble polymer amt.** (%) | Thickening accelerator No. | Thickening accelerator amt.** (%) | Slump flow value (cm) just after mixing | Slump flow value (cm) after 90 min | Segregation resistance | Self-packing properties |
|---|---|---|---|---|---|---|---|---|---|---|---|
| Present invention | 5 | 1 | 2.0 | 1 | 1.5 | 1 | 0.3 | 62.5 | 62.0 | ○ | ○ |
| | | 2 | 2.5 | 1 | 1.5 | 2 | 0.1 | 58.5 | 59.0 | ○ | ○ |
| | | 3 | 1.8 | 1 | 1.5 | 3 | 2.5 | 63.0 | 62.5 | ○ | ○ |
| | | 4 | 1.8 | 1 | 1.5 | 4 | 7.5 | 65.0 | 64.5 | ○ | ○ |
| | | 5 | 1.2 | 1 | 1.5 | 5 | 6.0 | 62.0 | 61.5 | ○ | ○ |
| | | 6 | 1.0 | 1 | 1.5 | 5 | 6.0 | 67.5 | 66.0 | ○ | ○ |
| | | 7 | 1.1 | 1 | 1.5 | 6 | 1.5 | 56.0 | 57.5 | ○ | ○ |
| | 1 | 4 | 1.2 | 1 | 0.5 | 5 | 1.5 | 60.5 | 59.5 | ○ | ○ |
| | | 4 | 1.5 | 1 | 1.0 | 5 | 3.0 | 62.5 | 60.5 | ○ | ○ |
| | | 4 | 1.8 | 1 | 1.5 | 5 | 4.5 | 69.5 | 68.0 | ○ | ○ |
| | 2 | 1 | 2.0 | 8 | 1.2 | 2 | 0.2 | 60.5 | 60.5 | ○ | ○ |
| | 3 | 1 | 2.2 | 8 | 0.7 | 3 | 2.1 | 61.5 | 61.0 | ○ | ○ |
| | 4 | 1 | 1.8 | 8 | 1.8 | 4 | 5.4 | 67.0 | 66.0 | ○ | ○ |

*: wt. % based on cement
**: wt. % based on water

TABLE 6

| Division | Formulation No. | Plasticizer No. | Plasticizer amt.* (%) | Water-soluble polymer No. | Water-soluble polymer amt.** (%) | Thickening accelerator No. | Thickening accelerator amt.** (%) | Slump flow value (cm) just after mixing | Slump flow value (cm) after 90 min | Segregation resistance | Self-packing properties |
|---|---|---|---|---|---|---|---|---|---|---|---|
| Present invention | 4 | 1 | 1.8 | 1 | 1.5 | 5 | 4.5 | 62.5 | 60.5 | ○ | ○ |
| | | 1 | 1.8 | 2 | 2.0 | 5 | 6.0 | 64.0 | 63.0 | ○ | ○ |
| | | 1 | 1.8 | 3 | 4.0 | 5 | 12.0 | 61.0 | 60.5 | ○ | ○ |
| | | 1 | 1.8 | 4 | 2.5 | 5 | 7.5 | 66.5 | 66.0 | ○ | ○ |
| | | 1 | 1.8 | 5 | 5.0 | 5 | 15.0 | 60.0 | 60.0 | ○ | ○ |
| | | 1 | 1.8 | 6 | 2.0 | 5 | 6.0 | 69.0 | 68.0 | ○ | ○ |

TABLE 6-continued

| Division | Formulation No. | Plasticizer No. | Plasticizer amt.* (%) | Water-soluble polymer No. | Water-soluble polymer amt.** (%) | Thickening accelerator No. | Thickening accelerator amt.** (%) | Slump flow value (cm) just after mixing | Slump flow value (cm) after 90 min | Segregation resistance | Self-packing properties |
|---|---|---|---|---|---|---|---|---|---|---|---|
| | | 1 | 1.8 | 7 | 0.1 | 5 | 0.3 | 65.0 | 64.0 | ○ | ○ |
| | | 1 | 1.8 | 8 | 2.3 | 5 | 6.9 | 68.5 | 67.0 | ○ | ○ |
| Comparison | 1 | 8 | 3.0 | 1 | 1.2 | 5 | 3.6 | 39.0 | 30.0 | ○ | x |
| | | 8 | 4.0 | 1 | 1.5 | 5 | 4.5 | 42.5 | 38.5 | ○ | x |
| | | 8 | 5.0 | 1 | 1.8 | 5 | 5.4 | 45.5 | 41.5 | ○ | x |
| | | 8 | 4.0 | 2 | 2.0 | 3 | 6.0 | 40.0 | 36.5 | ○ | x |
| | | 4 | 1.5 | 9 | 0.04 | | — | 40.5 | 38.0 | x | x |
| | | 4 | 1.5 | 9 | 0.04 | 1 | 0.12 | 35.5 | 31.0 | Δ | x |
| | | 4 | 1.8 | 9 | 0.10 | | — | 34.0 | 29.5 | ○ | x |
| | | 4 | 1.8 | 1 | 1.5 | | — | 64.0 | 48.5 | ○ | x |
| | 4 | 8 | 3.0 | 1 | 1.2 | 5 | 3.6 | 35.5 | 31.0 | ○ | x |
| | | 8 | 4.0 | 1 | 1.5 | 5 | 4.5 | 37.0 | 35.5 | ○ | x |
| | | 8 | 5.0 | 1 | 1.8 | 5 | 5.4 | 40.5 | 36.0 | ○ | x |
| | | 4 | 1.5 | 9 | 0.04 | | — | 42.5 | 40.0 | x | x |
| | | 4 | 1.5 | 9 | 0.10 | | — | 36.0 | 33.5 | ○ | x |
| | | 1 | 1.8 | 8 | 2.3 | | — | 62.5 | 46.0 | ○ | x |

*: wt. % based on cement
**: wt. % based on water

As is apparent from the foregoing results, the hydraulic composition of the present invention can exhibit a high flowability of at least 50 cm in terms of slump flow value and good segregation resistance to secure excellent self-packing properties. Furthermore, a concrete reduced in a decrease in the self-packing properties with time can be prepared.

On the other hand, the comparisons, though satisfactory in segregation resistance when prepared using a plasticizer, have a slump value of about 45 cm even when admixed with 5% of the plasticizer to fail to have sufficient self-packing properties. It is also understandable that, when a water-soluble polymer such as methylcellulose is used, it functions in such a manner as to notably lower the flowability of the resulting hydraulic composition, which is therefore incapable of having excellent self-packing properties irrespective of either use or disuse of a thickening accelerator.

When no thickening accelerator is used, the resulting hydraulic composition, though excellent in initial self-packing properties, is decreased in self-packing properties with the lapse of time.

As is apparent from the foregoing results, the hydraulic composition of the present invention can exhibit a high flowability of at least 50 cm in terms of slump flow value and good segregation resistance to secure excellent self-packing properties. Furthermore, a concrete reduced in a decrease in the self-packing properties with time can be prepared.

On the other hand, the comparisons, though satisfactory in segregation resistance when prepared using a plasticizer, have a slump value of about 45 cm even when admixed with 5% of the plasticizer to fail to have sufficient self-packing properties. It is also understandable that, when a water-soluble polymer such as methylcellulose is used, it functions in such a manner as to notably lower the flowability of the resulting hydraulic composition, which is therefore incapable of having excellent self-packing properties irrespective of either use or disuse of a thickening accelerator.

When no thickening accelerator is used, the resulting hydraulic composition, though excellent in initial self-packing properties, is decreased in self-packing properties with the lapse of time.

We claim:

1. A hydraulic composition comprising:

(a) a polyoxyalkylene derivative having a polyoxyalkylene chain having 10 to 2,000 mol of added alkylene oxide units and having its molecular terminals rendered hydrophobic;

(b) a thickening accelerator having a weight-average molecular weight of at most 5,000;

(c) a superplasticizer; and (d) a hydraulic powder.

2. The hydraulic composition as claimed in claim 1, wherein said polyoxyalkylene derivative (a) is at least one member selected from the following groups (i) to (iii):

(i) a reaction product prepared from an alkylene oxide adduct of a monohydric alcohol having 6 to 30 carbon atoms in the molecule, a monocarboxylic acid having 6 to 30 carbon atoms in the molecule, a monovalent mercaptan having 6 to 30 carbon atoms in the molecule or an alkylphenol having 6 to 30 carbon atoms in the molecule with 10 to 1,000 mol of an alkylene oxide, and a compound having 2 to 6 epoxy groups, a dicarboxylic acid, a dicarboxylic acid anhydride or a diisocyanate;

(ii) a reaction product prepared from an epoxy compound having 6 to 30 carbon atoms, a fatty acid having 6 to 30 carbon atoms or an alkyl isocyanate having 6 to 30 carbon atoms, and a polyalkylene oxide prepared by polymerizing 10 to 2,000 mol of an alkylene oxide; and (iii) a reaction product prepared by reacting at least one compound selected from the group consisting of compounds having 2 to 6 epoxy groups, dicarboxylic acids, dicarboxylic acid anhydrides and diisocyanates with a polyalkylene glycol having 10 to 2,000 mol of oxyalkylene oxide chains, and then reacting the resulting product with an epoxy compound having 6 to 30 carbon atoms, a fatty acid having 8 to 30 carbon atoms or an alkyl isocyanate having 6 to 30 carbon atoms.

3. The hydraulic composition as claimed in claim 1, wherein said thickening accelerator (b) is at least one member selected from the group consisting of an anionic, a cationic, an ampholytic and a nonionic surfactant.

4. A hydraulic composition as claimed in claim 1, wherein said thickening accelerator (b) is a nonionic surfactant of 12 to 18 in HLB.

5. A hydraulic composition as claimed in claim 1, wherein said superplasticizer is a formaldehyde condensate of at least one compound selected from the group consisting of methylolation and sulfonation products of each of naphthalene, melamine, phenol, urea, and aniline.

6. A hydraulic composition as claimed in claim 1, wherein said superplasticizer is a polymer or copolymer obtained by polymerizing at least one monomer selected from the group consisting of unsaturated monocarboxylic acids and derivatives thereof, and unsaturated dicarboxylic acids and derivatives thereof.

7. A hydraulic composition as claimed in claim 1, which has a slump value of 50 to 70 cm in the slump test as stipulated in JIS A 1101.

8. A hydraulic composition comprising a water-soluble polymer in the form of a polyalkylene oxide derivative having a hydroxyl number of at most 50 KOH-mg/g in terms of terminal hydroxyl groups rendered hydrophobic; a thickening accelerator having a weight-average molecular weight of at most 5,000; a superplasticizer; and a hydraulic powder.

9. The hydraulic composition as claimed in claim 2, wherein said thickening accelerator (b) is at least one member selected from the group consisting of an anionic, a cationic, an ampholytic and a nonionic surfactant.

10. The hydraulic composition as claimed in claim 2, wherein said thickening accelerator (b) is a nonionic surfactant of 12 to 18 in HLB.

11. The hydraulic composition as claimed in claim 2, wherein said thickening accelerator (b) is a nonionic surfactant of 12 to 18 in HLB.

12. A hydraulic composition as claimed in claim 3, wherein said superplasticizer is a formaldehyde condensate of at least one compound selected from the group consisting of methylolation and sulfonation products of each of naphthalene, melamine, phenol, urea, and aniline.

13. A hydraulic composition as claimed in claim 4, wherein said superplasticizer is a formaldehyde condensate of at least one compound selected from the group consisting of methylolation and sulfonation products of each of naphthalene, melamine, phenol, urea, and aniline.

14. A hydraulic composition as claimed in claim 2, wherein said superplasticizer is a polymer or copolymer obtained by polymerizing at least one monomer selected from the group consisting of unsaturated monocarboxylic acids and derivatives thereof, and unsaturated dicarboxylic acids and derivatives thereof.

15. A hydraulic composition as claimed in claim 3, wherein said superplasticizer is a polymer or copolymer obtained by polymerizing at least one monomer selected from the group consisting of unsaturated monocarboxylic acids and derivatives thereof, and unsaturated dicarboxylic acids and derivatives thereof.

16. A hydraulic composition as claimed in claim 4, wherein said superplasticizer is a polymer or copolymer obtained by polymerizing at least one monomer selected from the group consisting of unsaturated monocarboxylic acids and derivatives thereof, and unsaturated dicarboxylic acids and derivatives thereof.

17. A hydraulic composition as claimed in claim 2, which has a slump value of 50 to 70 cm in the slump test as stipulated in JIS A 1101.

18. A hydraulic composition as claimed in claim 3, which has a slump value of 50 to 70 cm in the slump test as stipulated in JIS A 1101.

19. A hydraulic composition as claimed in claim 4, which has a slump value of 50 to 70 cm in the slump test as stipulated in JIS A 1101.

20. A hydraulic composition as claimed in claim 5, which has a slump value of 50 to 70 cm in the slump test as stipulated in JIS A 1101.

21. A hydraulic composition as claimed in claim 6, which has a slump value of 50 to 70 cm in the slump test as stipulated in JIS A 1101.

22. A method of improving the self packing property of a hydraulic composition which comprises including a thickening accelerator having a weight-average molecular weight of at most 5,000, in a hydraulic composition comprising: a polyoxyalkylene derivative having a polyoxyalkylene chain having 10 to 2,000 mol of added alkylene oxide units and having its molecular terminals rendered hydrophobic; a superplasticizer; and a hydraulic powder.

* * * * *